United States Patent [19]
Judkins et al.

[11] Patent Number: 6,084,996
[45] Date of Patent: Jul. 4, 2000

[54] BROADBAND LONG-PERIOD GRATINGS

[75] Inventors: Justin Boyd Judkins, Scotch Plains; Ashish Madhukar Vengsarkar, Berkeley Heights, both of N.J.; Jefferson Lynn Wagener, Charlottesville, Va.

[73] Assignee: Lucent Technologies, Inc., Murray Hill, N.J.

[21] Appl. No.: 09/053,236

[22] Filed: Apr. 1, 1998

[51] Int. Cl.[7] .................................................. G02B 6/34

[52] U.S. Cl. .................................................. 385/37

[58] Field of Search ......................... 385/37, 24

[56] References Cited

U.S. PATENT DOCUMENTS

| 5,757,540 | 5/1998 | Judkins et al. | 385/37 |
| 5,953,471 | 9/1999 | Espindola et al. | 385/37 |

*Primary Examiner*—Hung N. Ngo

[57] ABSTRACT

This invention is predicated on applicants' discovery that one can design long-period gratings having a center wavelength versus A characteristic which changes polarity of slope near a wavelength of interest. Such a grating can be chirped to exhibit a wider bandwidth than chirped conventional gratings, e.g. 100 nm as compared to 20 nm. The new wide bandwidth gratings are highly useful in optical communications systems for dispersion compensation and for compensation of spectrally dependent optical amplifiers.

13 Claims, 6 Drawing Sheets

BROADBAND LONG-PERIOD GRATINGS

FIELD OF THE INVENTION

This invention pertains to long-period gratings and specifically to long-period gratings that have broad spectral properties.

BACKGROUND OF THE INVENTION

Long-period gratings typically comprise a length of fiber wherein a plurality of refractive index perturbations are spaced along the fiber by a periodic distance $\Lambda$. In contrast with conventional Bragg gratings, long-period gratings utilize a periodic spacing $\Lambda$ which is typically at least ten times greater than the transmitted wavelength $\lambda$, i.e. $\Lambda > 10 \lambda$. The key distinguishing property of a long-period grating is its ability to couple light from one optical mode of a fiber to another mode propagating in the same direction, with very low back-reflection. (This is in contrast with short-period Bragg gratings that couple to back-propagating modes and hence, reflect light.) Specific examples of these modes include coupling from a guided mode to a non-guided mode, from one guided mode to another guided mode, or from one polarization mode to another polarization mode. A non-guided mode is a spatial mode that is not defined by the core alone but rather by the entire fiber structure. Usually the non-guided mode is a cladding mode, a leaky mode or, in the case of a multiple-layered cladding, a ring mode.

Long-period gratings that couple light from the guided mode to a non-guided (cladding) mode are useful as wavelength-dependent loss elements. For example, these gratings are used for broadband high power sources (C. W. Hodgson, et al., 9 Optical Society of America Technical Digest Series, Paper TuG3 (1996)), as gain-equalizers in optical amplifiers, (Vengsarkar et al., 21 Optics Letters, 336 (1996)), as noise-rejection filters in erbium doped amplifiers (Vengsarkar et al. 14, J. Lightwave Technology, 58 (1996)) and in cascaded high-power Raman lasers (S. G. Grubb and A. J. Stentz, Laser Focus World, p. 127 (February 1996)).

In each instance, the wavelength range over which efficient transfer of optical power takes place defines the utility of the device. While many such devices based on long-period gratings have been designed and demonstrated, the bandwidth of operation has usually been restricted to 5–10 nm. This range is severely restricting, especially since the useful erbium amplifier bandwidth is about 35 nm. One method of increasing the fiber grating bandwidth is to chirp the grating so that the period $\Lambda$ varies along the length. While chirping allows some increased bandwidth the increase is usually at the expense of a reduction in the extent of mode-conversion. Hence, there is a need for long-period gratings having wider bandwidths.

SUMMARY OF THE INVENTION

This invention is predicated on applicants' discovery that one can design long-period gratings having a center wavelength versus $\Lambda$ characteristic which changes polarity of slope near a wavelength of interest. Such a grating can be chirped to exhibit a wider bandwidth than chirped conventional gratings, e.g. 100 nm as compared to 20 nm. The new wide bandwidth gratings are highly useful in optical communications systems for dispersion compensation and for compensation of spectrally dependent optical amplifiers.

BRIEF DESCRIPTION OF THE DRAWINGS

The advantages, nature and various additional features of the invention will appear more fully upon consideration of the illustrative embodiments now to be described in detail. In the accompanying drawings.

It is to be understood that these drawings are for purposes of illustrating the concepts of the invention and, except for graphical illustrations, are not to scale.

DETAILED DESCRIPTION

This description is divided into three parts. Part I describes qualitatively the new wide bandwidth long-period grating of the invention. Part II describes preferred applications of the new grating. And Part III describes quantitative methods for designing such gratings for specific applications.

I. The New Wide Bandwidth Grating

The new wide bandwidth long-period grating is similar to conventional long-period grating except that the optical fiber is designed and the grating period $\Lambda$ is chosen so that for the modes and wavelength of interest, the rate of change of the period with respect to wavelength is approximately 0, i.e. $d\Lambda/d\lambda \approx 0$. This section describes the general features and a specific example of such a grating.

Figure 1:
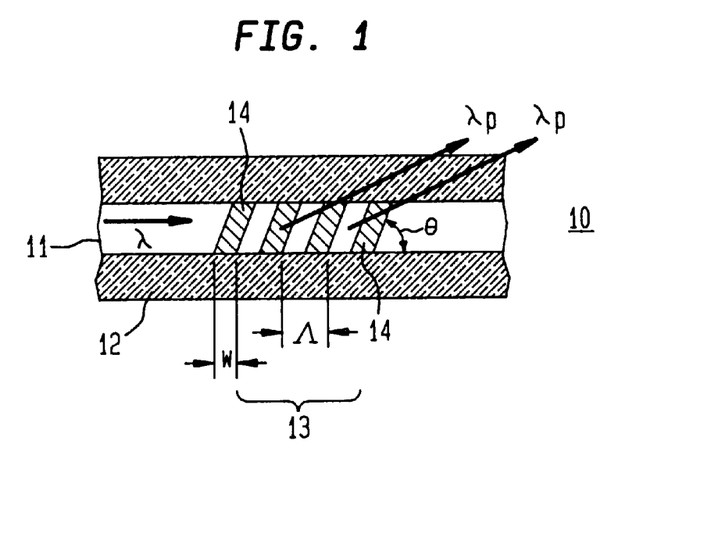
FIG. 1 is a schematic cross section of a long-period grating.

Referring to the drawings, FIG. 1 is a schematic cross section showing the general features of a long-period grating. The grating comprises a length of optical fiber 10 for transmitting light in a guided mode. The fiber has a core 11 surrounded by a lower index cladding 12. The core 11 includes a long-period grating 13 comprising a plurality of index perturbations 14 of width w spaced apart by a periodic distance $\Lambda$ where, typically, $5 \, \mu m \leq \Lambda \leq 1500 \, \mu m$. Advantageously $\frac{1}{5} \Lambda \leq w \leq \frac{4}{5} \Lambda$ and preferably $w = \frac{1}{2} \Lambda$. The perturbations are formed within the glass core of the fiber and preferably form an angle $\theta$ with the longitudinal axis of the fiber where $2° \leq \theta \leq 90°$. The fiber is designed to transmit broad band light.

The spacing $\Lambda$ of the perturbations is chosen to shift transmitted light in the region of a selected wavelength $\lambda_p$ from a guided mode into a second mode, thereby reducing in the guided mode, the intensity of a band of light centered about $\lambda_p$.

Figure 2:
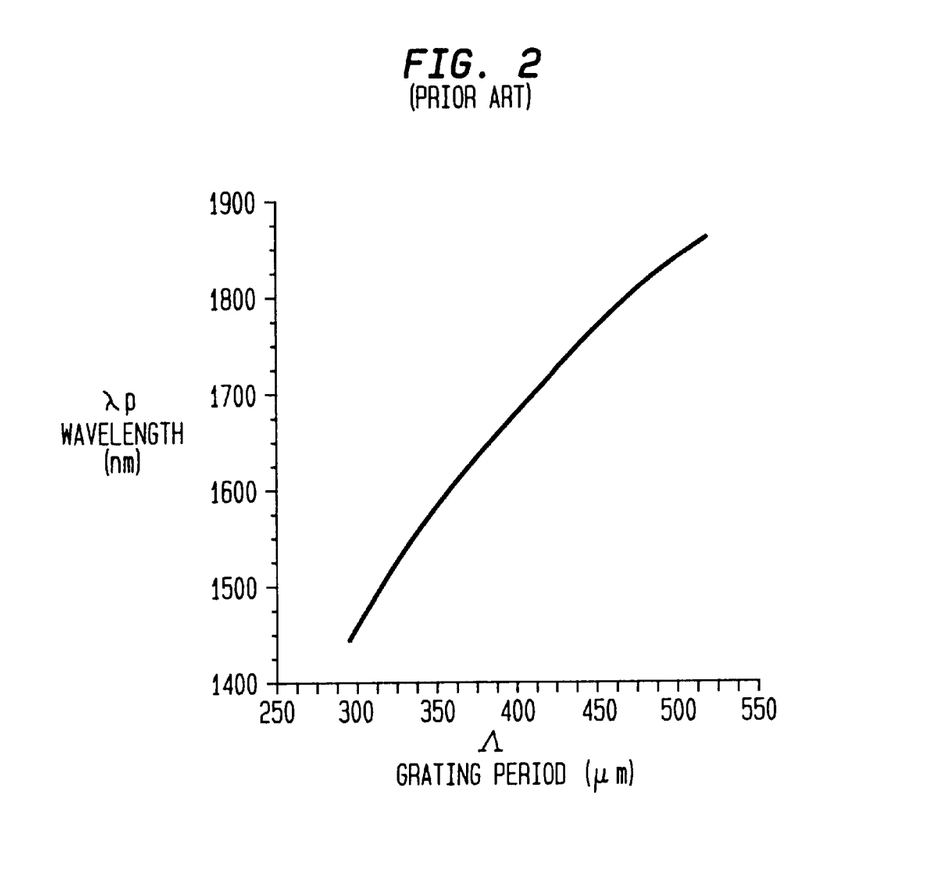
FIG. 2 is a graphical plot of center wavelength versus period for a conventional long-period grating.
Figure 3:
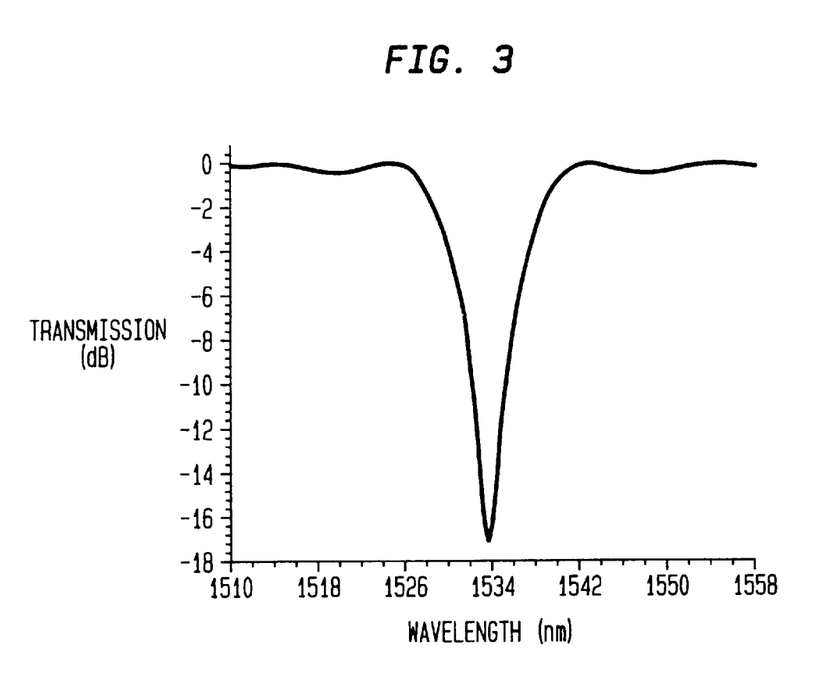
FIG. 3 is a typical transmission spectrum of a conventional long-period grating.

The new wide bandwith grating of the invention differs from a conventional long-period grating in the variation of $\lambda_p$ with grating period. FIG. 2 is a graphical plot of $\lambda_p$ versus period for a conventional long-period grating. As can be seen, the plot is monotonically increasing. This monotonic behavior means that for wavelengths of interest $d\Lambda/d\lambda_p$ is always of the same polarity (here positive). The consequence is that the grating is limited in bandwidth. This limitation can be seen by reference to FIG. 3 which shows the transmission spectrum of a typical conventional long-period grating. Even with chirping the bandwidth is not widened much more than 20 nm.

Figure 4:
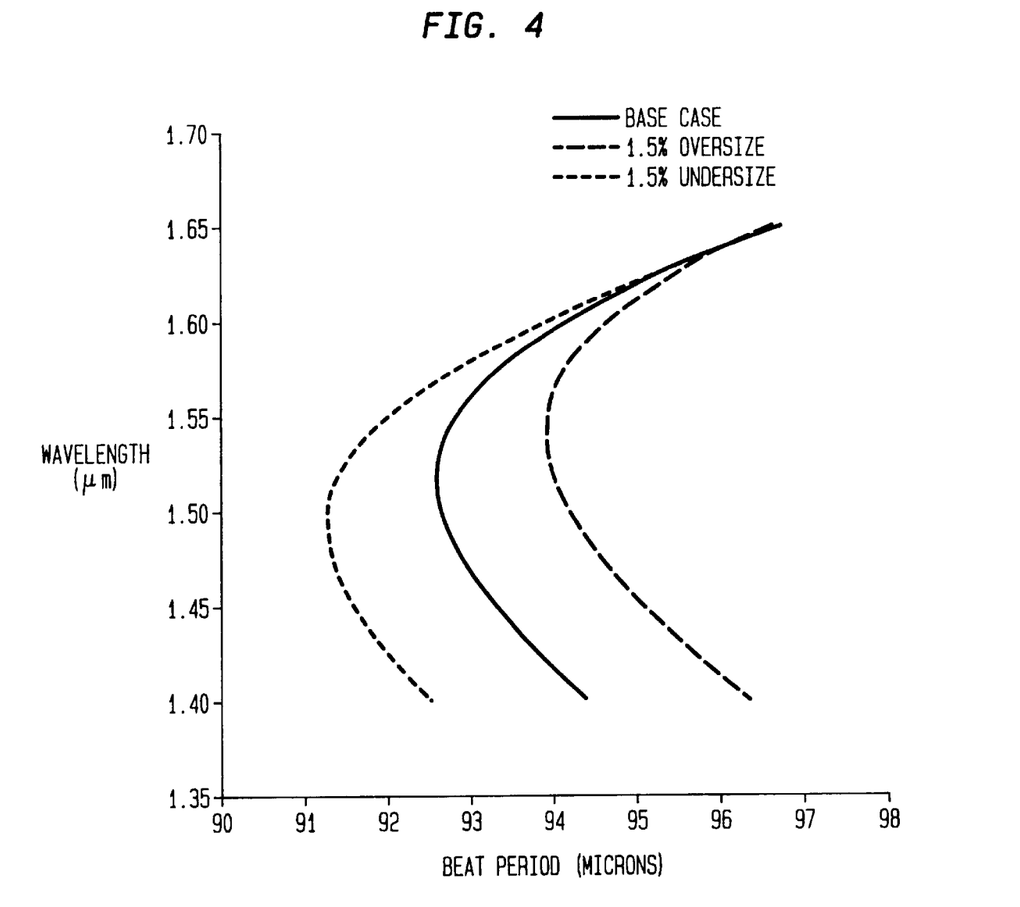
FIG. 4 is a graphical plot of center wavelength versus period for a typical long-period grating in accordance with the invention.

In contrast, the new wide bandwidth long-period grating is designed so that $d\Lambda/d\lambda_p$ exhibits two polarities and the turning point where $d\Lambda/d\lambda_p \approx 0$ is at the wavelength of interest. FIG. 4 shows $\lambda_p$ versus the period (best length) for typical new gratings. At the wavelength where $d\Lambda/d\lambda_p \approx 0$, the grating exhibits a bandwidth which is increased as compared with conventional long-period gratings. Moreover the bandwidths can be further increased by chirping.

Figure 5:
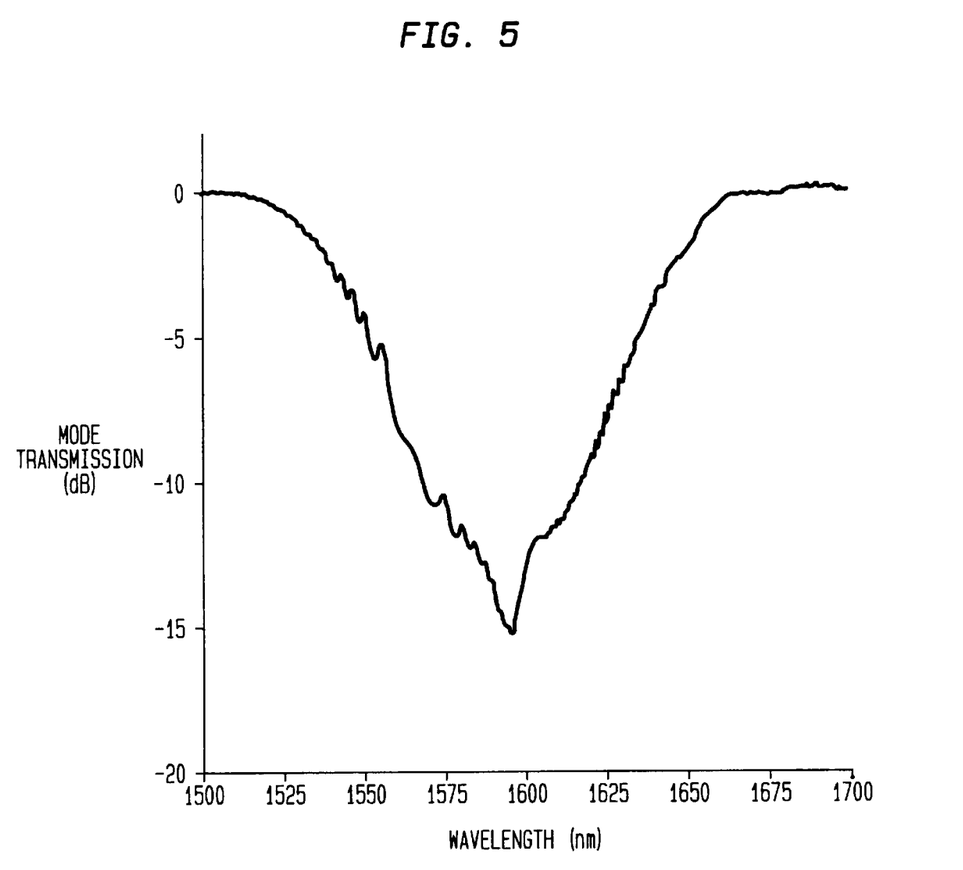
FIG. 5 is a transmission spectrum of a typical long-period grating in accordance with the invention.

FIG. 5 is the transmission spectrum of the long-period grating of FIG. 4. This new grating, even without chirping, has a bandwidth on the order of 50 nm.

Figure 6:
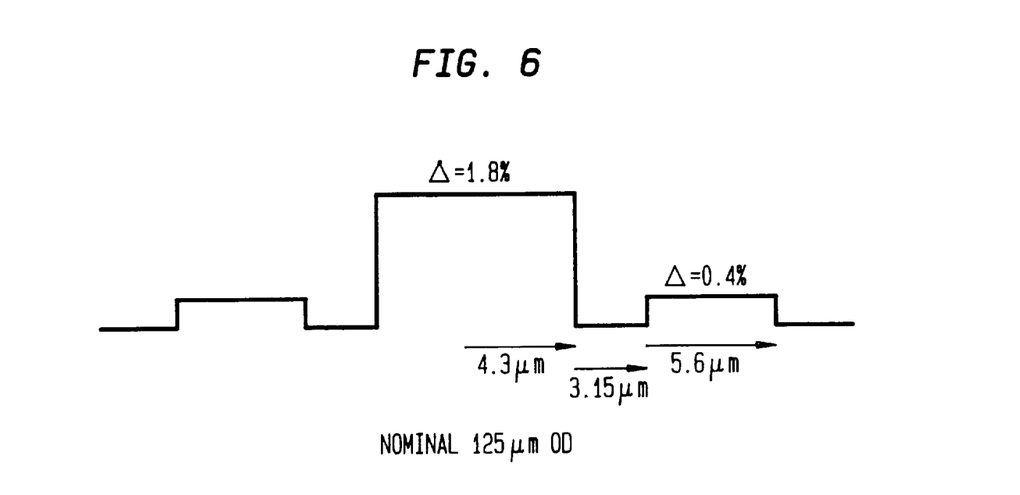
FIG. 6 is an index profile for an exemplary long-period grating in accordance with the invention.

FIG. 6, which is an index profile, presents an exemplary design of a fiber for a new long-period grating fiber. As can be seen the fiber comprises four concentric regions. The first region is a core region having a radius of 4.3 $\mu$m. The cladding is a composite cladding comprising a second concentric region of 3.15 $\mu$m thickness and a third concentric region of 5.6 $\mu$m thickness, and a fourth region extending out to provide a nominal 125 $\mu$m outside diameter. As compared to the refractive index of the second region, the core has an index 1.8% higher, the third region has an index 0.4% higher than the second region and the fourth region has the same index as the second. This design can be implemented by silica doped with germanium in the core, undoped or slightly fluorinated in the second region, and germanium or phosphorus in the third region. The fourth region is usually undoped silica. Before grating formation, the fiber is advantageously loaded with molecular hydrogen to enhance its photosensitivity.

The grating can be formed by selectively exposing the fiber core to beams of intense light of width w at locations separated by the distance $\Lambda$. The preferred exposure source is UV radiation from a KrF excimer laser. Proper spacing can be effected by exposing through a slit of width w and then moving the fiber to the next exposure site. Alternatively the fiber can be exposed to a wide beam from the laser through an amplitude mask providing a plurality of transparent slits at spacing $\Lambda$ and widths w. Preferably the exposure dosage for each slit is on the order of 1000 pulses of greater than 100 mJ/cm$^2$ fluence per pulse, and the number of perturbations is in the range 10–100.

The advantages of the FIG. 6 design can be seen from the solid-line calibration curve ($\lambda_p$ v. $\Lambda$) of FIG. 4. This device has $d\Lambda/d\lambda_p \approx 0$ in the region $\Lambda = [92.5, 93.5]$ $\mu$m and $\lambda_p = [1.5, 1.55]$ $\mu$m. This point of turnaround is made possible by the design of the fiber such that the group index of the two coupling modes is the same. That is, the differential group index $\Delta n_g$ is approximately equal to zero. This design has an impact on the 3-dB bandwidth of the grating and can be understood from Equation 6 from Vengsarkar et al., 14, *J. Lightwave Technology*, 58 (1996), namely, $$\Delta\lambda \approx 0.8\, \lambda^2/(\Delta n_g L),$$

which shows that the grating width is inversely proportional to the difference of the group indices. Here $\lambda$ is the wavelength of operation and L is the length of the grating. However, this equation does not apply when $\Delta_{ng}$ approaches zero. In this case, we have to take into account the second order effects and by using standard mathematical procedures for the evaluation of the 3-dB bandwidth, we can show that the expression is now given by $$\Delta\lambda \cong 1.8 \sqrt{\frac{\lambda^3}{C \cdot \Delta D \cdot L}},$$

where $\Delta D$ is the differential dispersion of the two modes and C is the speed of light in vacuum. For values of $\Delta n_g < 0.0025$, the turnaround point is helpful in achieving broadband gratings. In this region, a small chirp in periodicity $\Lambda$ can produce a large change in center wavelength $\lambda_p$. For example, a chirp of one micron at a center wavelength of 1.525 $\mu$m leads to efficient mode coupling over 100 nm. This can be compared to the device of FIG. 2 where a chirp of 10 $\mu$m was needed to produce wavelength coupling over 20 nm.

While each specific design allows broadband conversion at only a specific wavelength, fine tuning of the wavelength can be effected by drawing the fiber oversize or undersize. FIG. 4 illustrates this tuning with dashed-line curves A and B showing the wavelength shift for 1.5% oversize and 1.5% undersize, respectively. Another method of fine-tuning the wavelength is by incorporating a uniform uv-induced index change in the core. This rise in the background refractive index will move the turnaround point to a longer wavelength.

The transmission spectrum of the FIG. 6 device is that shown in FIG. 5. The spectrum (after the higher order LP$_{02}$ mode was stripped) shows a 50 mn bandwidth at the −10 dB point corresponding to 90% conversion. This is a tenfold increase in bandwidth. The design of wideband long-period gratings for different wavelengths and conversion between different modes is described in Part III, below.

II. Preferred Applications of the New Grating

Figure 7:
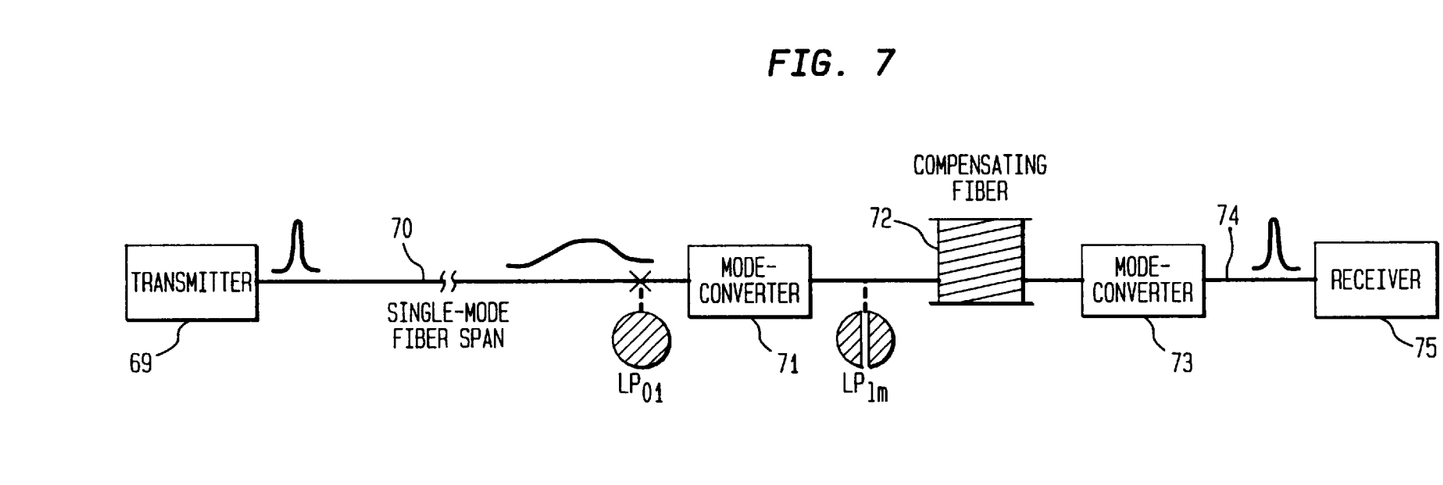
FIG. 7 shows an optical communications system using a wideband long period grating as a dispersion compensation element.

Long-period gratings that couple light from the fundamental mode to a higher-order spatial mode (say, the LP$_{11}$ or LP$_{02}$ mode) are useful in dispersion compensating modules that use the higher-order mode of a fiber close to cutoff to provide high negative dispersions. An optical communications system employing such a dispersion compensation module is schematically shown in FIG. 7. A single-mode transmission fiber 70 (which carries the dispersed pulses) is spliced to a mode-converting grating 71 that converts a large fraction (>90%) of the light into the higher order (denoted by LP$_{lm}$) mode. The grating is spliced to a dispersion-compensating fiber (DCF) 72 which provides a high negative dispersion and thus compresses the pulses. The DCF is further spliced to another mode-coupling grating 73 that couples light from the higher-order mode back to the fundamental mode. Finally, a single-mode fiber 74 spliced to the grating transmits the compressed pulses either to the receiver 75 or to the next span of a fiber optic system. For other applications of higher-order mode based dispersion compensation see Poole et al., 12 J. Lightwave Technology, 1746 (1994) which is incorporated herein by reference.

Figure 8:
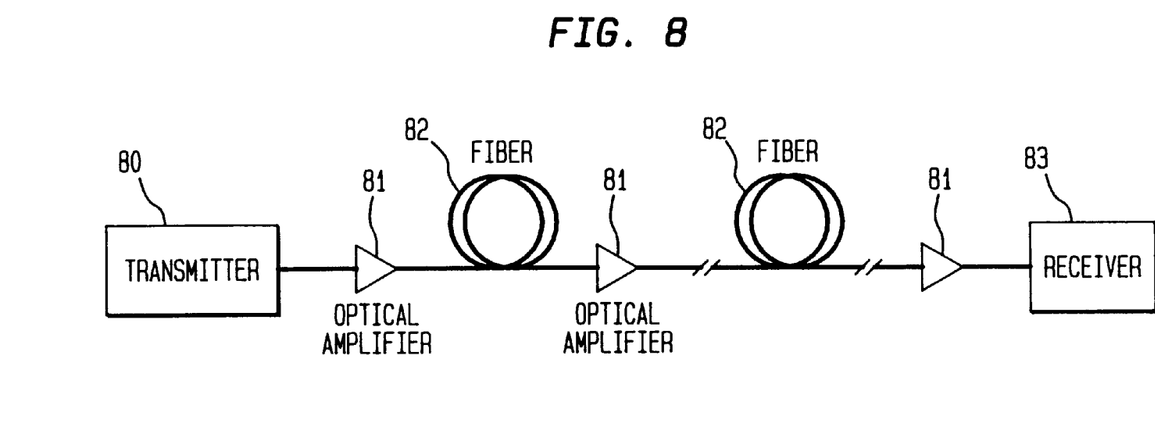
FIG. 8 shows an optical communications system using optical amplifier repeaters.

A second preferred application for the new grating is compensating optical fiber amplifiers. FIG. 8 schematically illustrates an optical communications system comprising a transmitter 80, a receiver 83 and an alternating sequence of optical amplifiers 81 and extended lengths of optical fiber 82 disposed between the transmitter and receiver. A known difficulty with such systems is that the amplifiers 81, particularly rare earth fiber amplifiers, exhibit gain which is a function of wavelength. To compensate this spectral dependence, a filter comprising a wide band long period grating as described herein, is disposed in series with one or more of the rare earth fibers to produce a more uniform spectral response. The advantage of the wideband filter is that it can equalize gain over a wide bandwidth corresponding to a multiplicity of communications channels.

Figure 9:
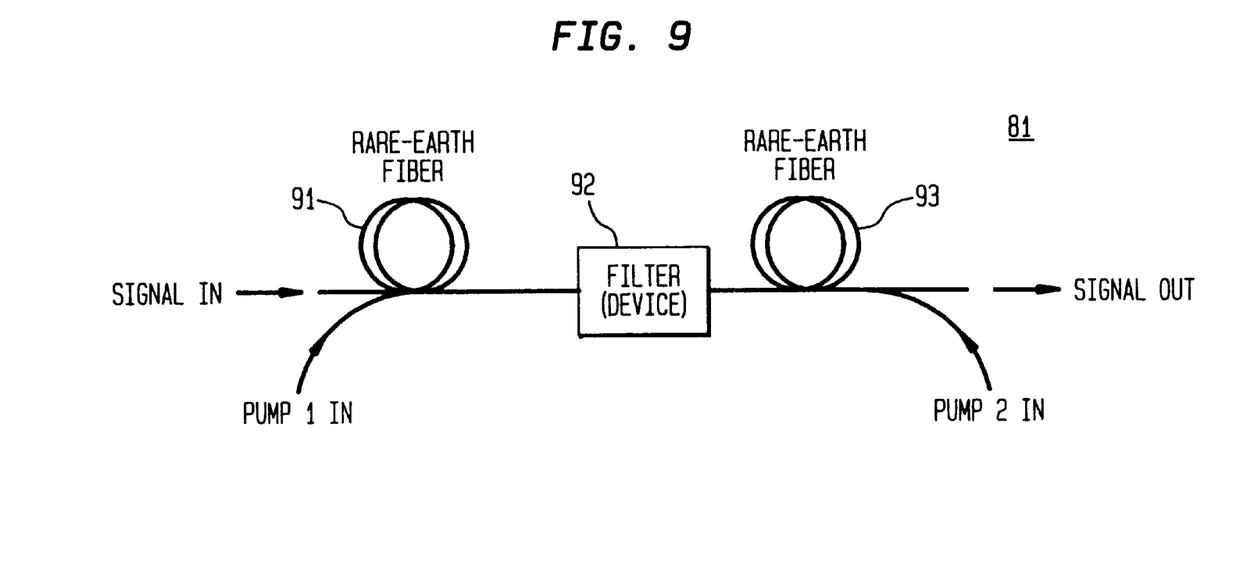
FIG. 9 shows a preferred optical amplifier for use in the system of FIG. 8.

FIG. 9 illustrates a preferred optical amplifier 81 for use in the communications system of FIG. 8. In essence, the amplifier comprises a pair of rare earth doped fibers 91, 93 with a 92 disposed between them. The filter comprises a wideband long period grating as described herein. The grating has a strength and bandwidth chosen to flatten the spectral output of the amplifier.

III. Design Principles

The governing equation for the peak wavelength, $\lambda_p$, at which light couples from one mode to another is $\lambda_p=(n_1-n_2)\Lambda$ where $n_1$ is the effective index of the first mode, $n_2$ is the effective index of the second mode and $\Lambda$ is the periodicity of the grating. Noting that $n_1$ and $n_2$ are dependent on the wavelength of operation $\lambda$, we can represent this as $$\lambda_p=(\Delta n)\Lambda, \qquad (\text{Eq. 1})$$

where $\Delta n=n_1-n_2$ is a function of $\lambda$.

Differentiating Eq. 1 with respect to $\lambda$ and solving for $d\Lambda/d\lambda$, we obtain $$\frac{d\lambda_p}{d\Lambda}=\frac{(\Delta n)^2}{(\Delta n_g)}, \qquad (\text{Eq. 2})$$

where $\Delta n_g$ is the differential group index defined by $\Delta n_g=\Delta n-\lambda d(\Delta n)/d\lambda$.

Now we can choose the wavelength $\lambda_p$ and modes of interest. Using standard numerical tools for modeling fibers with multiple index layers, a fiber can be designed subject to the constraint that $\Delta n_g$ is close to zero at $\lambda_p$ and changes sign on either side of the zero point. This can be done using the modeling tools set forth by T. Lenahan, "Calculation of modes in an optical fiber using the finite element method and EISPACK", Bell System Technical Journal, Vol. 62, p. 2663–2694, et seq. (1983), which is incorporated herein by reference.

This design process can be better understood by consideration of the following specific example:

EXAMPLE

We wish to design a three-moded fiber which guides the $LP_{01}$, $LP_{11}$ and $LP_{02}$ modes, such that coupling between the $LP_{01}$ and $LP_{02}$ modes at a wavelength of approximately 1550 nm can be induced by a grating whose periodicity is in the 15–1500 micron range. Further we would like a turn-around point (where the slope of the curve changes polarity) on the $\lambda$ vs. $\Lambda$ curve at~1.55 $\mu$m.

The first step in our design procedure is to start with a standard step-index fiber having a core containing 18% germanium (and hence $\Lambda$~1.8%) and a core diameter of~9 microns. This is a starting point for a design that allows the propagation of three modes. The choice of these parameters is based upon a simple calculation of waveguide parameters and allows ease of fabrication. Next, we use the computer simulation procedure described by Lenahan and calculate the effective indices $n_{01}$ and $n_{02}$ of the two modes under consideration. Given the wavelength behavior of the above two quantities, we then calculate the differential group index $\Delta n_g$ for the design. Upon finding that we cannot get $\Delta n_g$ close to zero at our wavelength of interest and in our range of grating periodicities, we incorporate the first iteration in the design. This iterative step is based on intuition and an understanding of how changing the profile will affect the group index of the $LP_{02}$ mode qualitatively. For example, we know that adding a ring to the profile will affect the group index of the $LP_{02}$ mode more than it will affect the group index of $LP_{01}$. Hence, we add a ring of $\Lambda=0.5\%$ approximately 10 microns away from the center of the fiber core. Similar iterative steps are incorporated into a computer simulation program which converges to the final design shown in FIG. 6. FIG. 4 shows the resultant $\lambda$ vs. $\Lambda$ curve which exhibits a turnaround point at~1.55 $\mu$m.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. In a long-period grating device for coupling light at an operating wavelength $\lambda$ between two co-propagating modes comprising a length of optical waveguide and a grating in said waveguide comprising a plurality of index perturbations spaced apart by spacing greater than 10 $\lambda$, said device exhibiting a peak coupling wavelength $\lambda_p$ which varies as a function of perturbation spacing $\Lambda$, the improvement wherein:

the slope $d\Lambda/d\lambda_p$ of said function changes polarity in the region of the operating wavelength $\lambda$.

2. The improved grating device of claim 1 wherein said optical waveguide comprises optical fiber.

3. The improved grating device of claim 2 wherein said modes are the $LP_{01}$ mode and the $LP_{02}$ mode.

4. The improved grating device of claim 1 wherein the bandwidth of said device over which 90% of the optical power is coupled from one mode to another is greater than 10 nm.

5. The improved grating device 1 wherein said grating is chirped.

6. In a long-period grating device for coupling light at an operating wavelength $\lambda$ between two copropagating modes comprising a length of optical waveguide and a grating in said waveguide comprising a plurality of index perturbations spaced apart by spacing greater than 10 $\lambda$, said two co-propagating modes having respective effective group indices $n_1$ and $n_2$ at the operating wavelength $\lambda$, the improvement wherein the difference $\Delta n_g$ between the two group indices is less than 0.0025.

7. The improved grating device of claim 6 wherein said optical waveguide comprises optical fiber.

8. The improved grating device of claim 7 wherein said modes are the $LP_{01}$ mode and the $LP_{02}$ mode.

9. The improved grating device of claim 6 wherein the bandwidth of said device over which 90% of the optical power is coupled from one mode to another is greater than 10 nm.

10. The improved grating device of claim 6 wherein said grating is chirped.

11. In an optical communications system comprising an optical signal transmitter, an optical receiver, and an optical path comprising optical fiber therebetween, said optical path subject to optical dispersion, the improvement wherein:

said optical path includes a dispersion compensation module comprising a wideband long-period grating according to claim 1 or claim 6.

12. The improved system of claim 11 wherein said dispersion compensation module comprises a first wideband long-period grating, a length of dispersion compensating fiber coupled downstream of said first grating, and a second wideband long-period grating coupled downstream of said dispersion compensating fiber.

13. In an optical communications comprising an optical signal transmitter, an optical receiver, an optical path comprising optical fiber and optical amplifiers therebetween, said optical amplifiers having wavelength-dependent gain, the improvement wherein:

said optical path includes at least one filter for reducing the spectral dependence of said amplifiers comprising a wideband long-period grating according to claim 1 or claim 6.

* * * * *